United States Patent [19]
Klein et al.

[11] 3,972,698
[45] Aug. 3, 1976

[54] ARRANGEMENT FOR ENERGY RECOVERY IN THE PURE-GAS OUTLET OF A CENTRIFUGAL SEPARATOR

[75] Inventors: Heinrich Klein; Rudolf Pieper, both of Erlangen, Germany

[73] Assignee: Siemens Aktiengesellschaft, Munich, Germany

[22] Filed: Aug. 8, 1974

[21] Appl. No.: 495,824

[30] Foreign Application Priority Data

Aug. 17, 1973 Germany .......................... 2341789

[52] U.S. Cl. .................................. 55/261; 55/414; 55/431; 55/457; 55/460; 209/144; 210/512 R

[51] Int. Cl.$^2$ ....................................... B01D 50/00

[58] Field of Search ............ 55/261, 392, 396, 399, 55/413, 414, 416, 424, 426, 431, 447, 448, 450, 456, 457, 458, 459, 460, 451; 210/512 R; 209/144

[56] References Cited

UNITED STATES PATENTS

| | | | |
|---|---|---|---|
| 1,952,281 | 3/1934 | Ranque | 55/396 X |
| 2,010,128 | 8/1935 | Arnold | 209/144 |
| 2,033,470 | 3/1936 | Keenan | 55/414 |
| 2,849,117 | 8/1958 | Rietema | 55/459 X |
| 3,740,929 | 6/1973 | Gordon et al. | 55/457 X |
| 3,744,220 | 7/1973 | Klein | 55/426 X |

*Primary Examiner*—Frank W. Lutter
*Assistant Examiner*—David L. Lacey
*Attorney, Agent, or Firm*—Kenyon & Kenyon Reilly Carr & Chapin

[57] ABSTRACT

An arrangement for improved energy recovery in the pure gas outlet of a centrifugal separator which includes a cylindrical centrifugal chamber with a coaxial raw gas inlet at one end and a coaxial pure gas outlet at the other end and which is equipped with tangential auxiliary gas inlets in the region of the periphery of the centrifugal chamber inclined at an angle with respect to the raw gas outlet with a particle outlet concentrically surrounding the raw gas inlet, in which the pure gas outlet is conically flared and opens with its larger end into a cylindrical, closed ring chamber which includes a cover plate opposite the open outlet tube. A radially extending plate of a diameter smaller than that of the cylindrical ring chamber is attached to the larger, open end of the conical outlet tube and an aerodynamic body in the shape of a circular cone protrudes from the cover plate into the opened conical outlet tube.

7 Claims, 5 Drawing Figures

ARRANGEMENT FOR ENERGY RECOVERY IN THE PURE-GAS OUTLET OF A CENTRIFUGAL SEPARATOR

BACKGROUND OF THE INVENTION

This invention relates to centrifugal separators in general, and more particularly to an improved arrangement for recovering energy at the pure gas outlet of such separators.

Centrifugal separators for separating fine grain particles are known in the art. Typical of such are those described in German Patents 1,220,240 and 1,507,847. In general they comprise a cylindrical centrifugal chamber with a coaxial raw gas inlet at one end and a coaxial pure gas outlet at the other end as well as tangential auxiliary gas inlets in the region of the periphery of the centrifugal chamber. These are disposed at an angle with respect to the raw inlet and carry the separated particles to a particle discharge concentrically surrounding the raw-gas inlet. Because in a centrifugal separator of this nature, the particle-laden raw gas is admitted into the centrifugal chamber with a rotary motion, the purified gas leaving at the opposite end still has a certain amount of rotation. The rotary flow continues into the pure gas line and generates unnecessarily high pressure losses therein.

Thus, it can be seen that there is a need for a device in which the energy of rotation can be recovered so that the overall pressure loss of the separator is reduced thereby.

Various types of diffusers have been suggested for the recovery of this energy. Typical is one described in Technische Stroemungslehre - Technical Fluid Dynamics - by Bruno Eck, Springer-Verlag, 1966, (particularly pg. 187.) Devices of this type, however, have had very little success in practice and furthermore have very large dimensions relative to the size of the rest of the apparatus since the recovery of the energy must take place without impact losses. Another suggestion is made in German Patent 1,278,203. In the arrangement disclosed therein, the separtor is designed with a pure gas outlet stub which is a diffuser and has its center axis inclined at an obtuse angle to the axis of the inlet nozzle so that it corresponds to the flow direction of the outgoing pure gas stream in the lateral outlet opening. This proposal also produces only a small amount of energy conversion from rotary energy into pressure energy and furthermore, requires considerable structure which is difficult to implement, particularly if the available space is limited.

In view of this, it is the object of the present invention to create a device which will recover the rotation energy without being unduly cumbersome and which will operate efficiently.

SUMMARY OF THE INVENTION

The present invention provides such a structure. To accomplish its objectives, the present invention provides a coaxial pure gas outlet tube which is flared out approximately conically in the flow direction and opens into a cylindrical ring chamber terminated at its end by a cover plate. The cylindrical ring chamber encloses at least the conical enlargement. A radially extending plate with a diameter smaller than that of the ring chamber is attached to the end of the conical enlargement. The outlet stub for the purified gas is provided in the cylindrical wall of the ring chamber approximately at the height of the radial plate. Furthermore, an aerodynamic body in the shape of a circular cone protrudes into the conical enlargement from the cover plate at the end of the ring chamber. Preferably, the angle of the conical arrangement is larger than the angle of the conical aerodynamic body.

This design of the pure gas outlet results in a uniform deceleration of the flow without separation of the flow from the wall and thereby permits a loss free deflection of the flow in the pure gas outlet. Because of this, less energy is required for producing rotation in the raw gas inlet.

DETAILED DESCRIPTION OF THE PREFERRED EMBODIMENT

Figure 1:
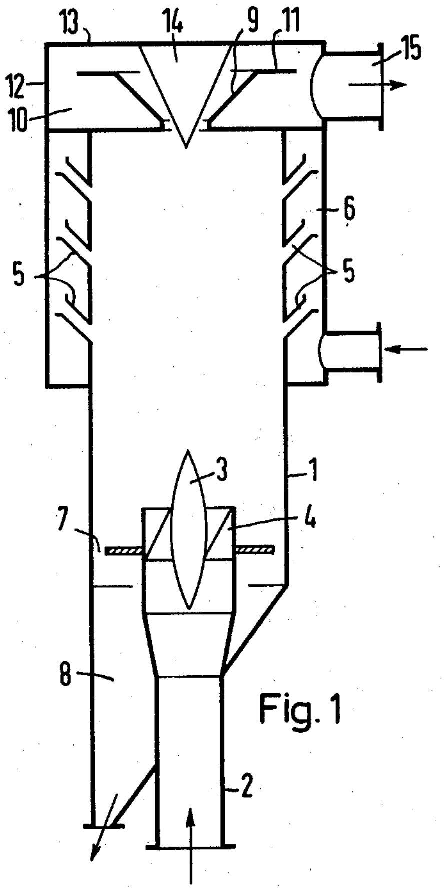
FIG. 1 shows a first type of centrifugal separator with a pure gas outlet according to the present invention.

FIG. 1 illustrates a centrifugal separator comprising a cylindrical centrifugal chamber 1 having at one end face thereof a coaxial raw gas inlet 2 opening into the chamber 1. The gas inlet 2 is constructed without a bend over a considerable length in order to avoid additional pressure losses. There are arranged in the region of the opening of the raw gas inlet tube 2 concentric to an axial aerodynamic body 3, guide vanes 4 which impart a rotary motion to the entering raw gas. In the upper portion of the centrifugal chamber 1 a plurality of tangential auxiliary gas inlets 5 are provided disposed at an angle with respect to the raw gas inlet. These are supplied with an auxiliary gas from an auxiliary gas chamber 6. In operation, the particles to be separated are thrown out from the stream of raw gas which is admitted with a rotary motion, and are carried through an annular outlet gap 7 into a bin 8 by means of the outer auxiliary gas flow which is admitted through the inlets 5 and which runs helically downward in the zone near the wall of the chamber 1.

The portion of the separator just described is conventional. What is different and what is the subject of the present invention is the pure gas outlet tube 9 at the top of the centrifugal chamber. The pure gas outlet tube is first of all, flared out in a conical manner to have a narrower end coupled to the chamber 1 and a larger end which opens into a ring chamber 10 closed at its top end by a cover plate 13. A radially extending plate 11 is attached to the larger end of the conical enlargement of the outlet tube 9. As illustrated, it has a smaller diameter than the cylindrical wall 12 of the ring chamber 10. In addition, an aerodynamic body in the shape of a circular cone 14 protrudes centrally into the conically enlarged outlet tube 9 from the cover plate 13 at the top of the ring space 10. An outlet stub 15 for the pure gas is provided at the cylindrical wall 12 of the ring space 10 approximately at the height of the radial plate 11. Preferably, this is attached tangentially to the wall 12 of the ring chamber 10.

This design of the pure gas outlet results in a continuous enlargement of the outflow cross section and thus in a deceleration of flow without separation of the flow from the wall. As a result, a loss free deflection of the flow in the outlet is obtained with the rotary motion energy residing in the flow recovered without loss. It is advantageous if the outlet stub 15 for the purified gas is attached to the ring chamber somewhat below the radial plate 11 so that the pure gas is deflected once more and the discharge cross section thereby reduced resulting in a further settling of the flow.

Figure 2:
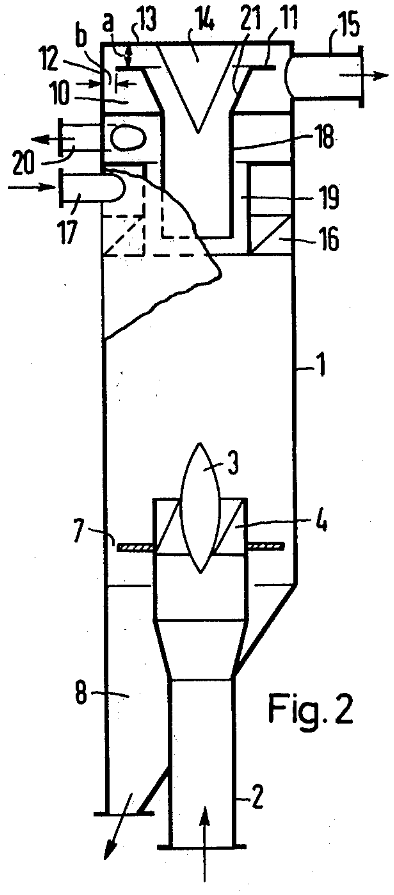
FIG. 2 illustrates an improved type of centrifugal separator with the same type of pure gas outlet.

FIG. 2 illustrates another embodiment of a centrifugal separator having a pure gas outlet according to the present invention. In this embodiment, the auxiliary gas enters through a ring of guide vanes 16 arranged between the pure gas outlet 18 and the wall of the cylindrical centrifugal chamber 1 rather than through inclined tangential nozzles. It is supplied with an auxiliary gas through a stub 17. Furthermore, a ring gap 19 is installed parallel to the coaxial pure gas inlet tube 18 through which ring gap a portion of the purified gas, namely that in its outer zone, is separately drawn off through an outlet 20 and returned as the auxiliary gas through the stub 17. In a manner similar to FIG. 1, the upper end 21 of the pure gas outlet tube is flared out conically terminating in a radial plate 11. Also, a conical aerodynamic body 14 extending from the plate 13 is installed and protrudes into the enlarged outlet 21 to essentially prevent the purified gas from flowing back centrally into the centrifugal chamber. In order to optimize the loss-free recovery of the energy, the spacing $a$ between the radial plate 11 and the end plate 13 as well as the spacing $b$ between the outer edge of plate 11 and the wall 12 of the ring chamber 10 can be varied depending on the intensity of the rotary motion still present in the purified gas.

Figure 3:
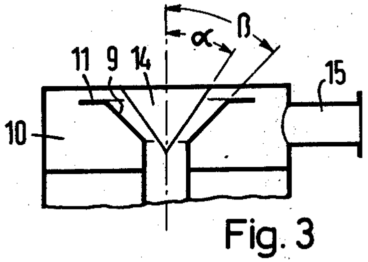
FIG. 3 and 4 illustrates the outlet design of the present invention in more detail, also illustrating an additional embodiment thereof.

FIG. 3 illustrates a further embodiment of the pure gas outlet. Only the outlet is shown with the separator itself being such as that shown in connection with FIG. 1 or 2. In this embodiment, the conically flared outlet tube 9 is extended into the ring chamber 10 a distance such that the pure gas outlet stub 15 is completely below the radial plate 11.

Also as shown on this figure is particularly advantageous to construct the pure gas outlet of the present invention such that the angle $\beta$ which the conical enlargement 9 makes with a central axis through the outlet tube 9 is larger than the angle $\alpha$ which the conical aerodynamic body 14 makes with its axis which is coincident with the central axis. By doing so, a better settling of the flow within a shorter travel distance is obtained. Preferably, the angular difference should not exceed 10°.

Figure 4:
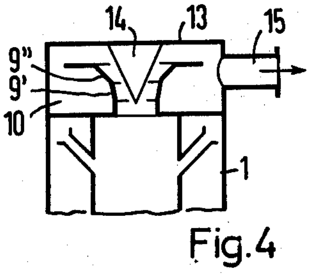

FIG. 4 illustrates a somewhat different embodiment, the prime difference being that the conical portion 9 has two different inclinations 9' and 9''.

Figure 5:
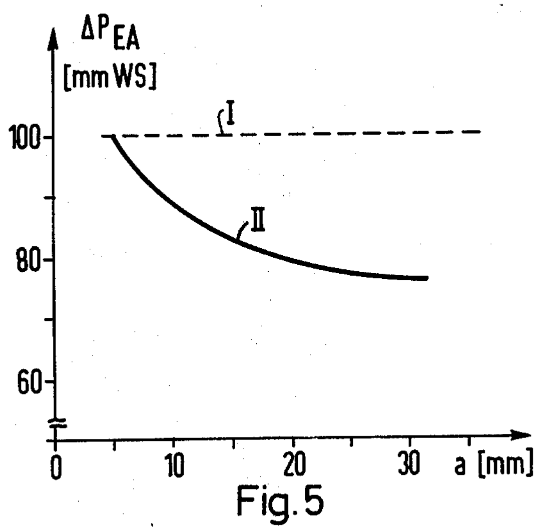
FIG. 5 is a plot illustrating the reduction of pressure loss using a pure gas outlet according to the present invention.

FIG. 5 is a curve illustrating the pressure loss $\Delta P_{EA}$ between the inlet and outlet of a centrifugal separator as a function of the distance $a$ between the radial plate 11 of FIG. 2 and the cover plate 13. In a centrifugal separator of conventional design, the pressure loss is approximately 100 mm water as illustrated by curve I. Curve II indicates however, that with appropriate design of the outlet, the pressure loss can be reduced by more than 20%. As a result, the smaller amount of excitation energy for imparting the rotary motion flow at the raw gas inlet can be used.

Thus, an arrangement for the recovery of energy in the pure gas outlet of a centrifugal separator has been shown. Although specific embodiments have been illustrated and described, it will be obvious to those skilled in the art that various modifications may be made without departing from the spirit of the invention which is intended to be limited solely by the appended claims.

What is claimed is:

1. In a centrifugal separator which comprises a cylindrical centrifugal chamber having a coaxial raw gas inlet at one end, said inlet having means to cause rotary motion of said gas, and a coaxial pure gas outlet at the other end and said separator is equipped with tangential auxiliary gas inlets in the wall of the centrifugal chamber between said inlet and outlet which inlets are inclined at an angle with respect to the raw gas inlet and includes a particle outlet concentrically surrounding the raw gas inlet, an improved arrangement for the recovery of energy in the pure gas outlet comprising:

a. a pure gas outlet tube, having a central axis, said outlet tube being flared out in an approximately conical manner so as to have a narrow open end and a larger open end; with its narrow end coupled to the other end of the cylindrical centrifugal chamber;

b. a cylindrical, closed chamber located at said other end of said centrifugal chamber, the larger end of said pure gas outlet tube extends into the closed cylindrical chamber, said chamber including a cover plate spaced from said larger end of said outlet tube;

c. a radially extending plate of a diameter smaller than the chamber attached to said larger end of said outlet tube;

d. an outlet conduit for the purified gas installed in the cylindrical wall of the ring chamber at approximately the height of said radial plate; and e. an aerodynamic body in the shape of a circular cone making a predetermined angle with its axis protruding from the cover plate into said outlet tube and having its axis coincident with said central axis.

2. An arrangement according to claim 1 wherein the flared outlet tube makes an angle with the central axis through said outlet tube which is larger than the angle the conical aerodynamic body makes with the central axis.

3. An arrangement according to claim 2 wherein the angular difference is not greater than 10°.

4. An arrangement according to claim 1 wherein the axis of the outlet conduit is below the height of said radial plate.

5. An arrangement according to claim 4 wherein said outlet conduit is attached tangentially to said cylindrical wall.

6. An arrangement according to claim 1 wherein said outlet conduit is attached tangentially to said cylindrical wall.

7. An arrangement according to claim 1 wherein said flared out conical portion has a first section beginning at said narrow end making a first angle with said central axis and a second section extending from said first section to said larger end making a second, greater angle than said first angle with respect to said central axis.

* * * * *